United States Patent [19]

Werner et al.

[11] 4,255,297

[45] Mar. 10, 1981

[54] ADHESIVE BINDING AGENTS AND ADHESIVES CONTAINING THEM

[75] Inventors: Gerhard Werner, Glashuütten; Heinz Schmelzer, Rümmelsheim; Richard Sattelmeyer, Schlangenbad-Georgenborn, all of Fed. Rep. of Germany

[73] Assignee: Hoechst Aktiengesellschaft, Frankfurt, Fed. Rep. of Germany

[21] Appl. No.: 967,016

[22] Filed: Dec. 6, 1978

[30] Foreign Application Priority Data

Dec. 22, 1977 [DE] Fed. Rep. of Germany ....... 2757177

[51] Int. Cl.$^3$ .................... C08G 61/02; C08L 65/00
[52] U.S. Cl. ........................ 260/5; 525/185; 528/392; 528/396
[58] Field of Search ............. 526/283, 290; 260/5, 260/887, 897; 525/185; 528/392

[56] References Cited

U.S. PATENT DOCUMENTS

| | | | |
|---|---|---|---|
| 1,982,707 | 12/1934 | Thomas | 528/392 |
| 3,422,053 | 1/1969 | Henderson et al. | 526/290 X |
| 3,763,125 | 10/1973 | Moody et al. | 526/290 X |
| 3,860,543 | 1/1975 | Masuda et al. | 526/290 X |
| 4,102,834 | 7/1978 | Morimoto et al. | 526/283 X |

FOREIGN PATENT DOCUMENTS

| | | | |
|---|---|---|---|
| 2234594 | 2/1973 | Fed. Rep. of Germany | 528/392 |
| 1043360 | 9/1966 | United Kingdom | 526/283 |
| 1043406 | 9/1966 | United Kingdom | 526/290 |

*Primary Examiner*—Wilbert J. Briggs, Sr.
*Attorney, Agent, or Firm*—Quaintance, Murphy & Richardson

[57] ABSTRACT

An adhesive binding agent based on at least one polymer of dicyclopentadiene and at least one aromatic hydrocarbon wherein the polymer comprises from 40 to 80% by weight of cyclopentadiene units and from 20 to 60% by weight of at least one aromatic hydrocarbon having a boiling point in the range from 110° to 220° C., selected from the group consisting of alkylaromatic hydrocarbons and tetrahydronaphthalene, said polymers having a mean molecular weight of from 300 to 5000, an iodine number (measured according to DIN Standard 53241, part 2) of from 0 to 60, and a melting point in the range of from 30° to 150° C., and an adhesive containing said binding agent in combination with a rubber or an ethylene-vinylacetate copolymer.

11 Claims, No Drawings

ADHESIVE BINDING AGENTS AND ADHESIVES CONTAINING THEM

This invention relates to novel adhesive binding agents as well as to adhesives which contain these binding agents.

Polymers and copolymers of dicyclopentadiene are known to be unsuitable as resin adhesives. Due to their high double bond content they are very susceptible to oxidation, which contributes especially to their poor storage stability in adhesives containing them. The heat resistance of such polymers is also low.

In order to reduce the ease of oxidation of dicyclopentadiene resins, large quantities of stabilisers may be admixed with them. However, this frequently leads to reduced adhesion characteristics. Attempts have been made to eliminate the double bonds by catalytic hydrogenation. Such hydrogenated resins have good resistance to oxidation and heat and have proved to be successful in adhesive binding agents. However, these products occasionally fail to meet the increasingly severe requirements demanded of adhesives.

Nevertheless, dicyclopentadiene resins which may be prepared without expensive catalytic hydrogenation processes carried out under superatmospheric pressure and which require only small quantities of oxidation stabilisers, if any, are still desired.

It has now been found that this object may be satisfied.

Thus, according to one aspect of the invention there is provided an adhesive binding agent based on at least one polymer of dicyclopentadiene and one or more aromatic hydrocarbons wherein the copolymer comprises from 40 to 80% by weight of cyclopentadiene units and from 20 to 60% by weight of at least one aromatic hydrocarbon selected from alkylaromatic hydrocarbons and tetrahydronaphthalene having a boiling point in the range of 110° to 220° C., a mean molecular weight of from 300 to 5000 and preferably from 400 to 1000, an iodine number (measured according to DIN Standard 53241, part 2) of from 0 to 60 and preferably 0 to 10, and a melting point in the range of from 30° to 150° C. and preferably from 40° to 100° C., (capillary method).

The binding agents according to the invention may not only be prepared in a technically simpler way and at less cost than hydrogenated cyclopentadiene resins, but they also have an improved peeling resistance when incorporated into adhesives.

The binding agents according to the invention may be prepared in a known way, for example, by a Friedel-Crafts reaction. The reaction conditions are desirably selected so that dissociation and homopolymerisation of the dicyclopentadiene are avoided as far as possible and the alkylation reaction is assisted. The process is therefore conveniently carried out so that the Friedel-Crafts catalyst is applied to the aromatic compound and the dicyclopentadiene is added continuously. With this mode of operation the double bonds of the dicyclopentadiene are almost completely saturated by the addition of the aromatic compounds, so that the optimal resins have iodine numbers of only 0 to 5. They therefore differ markedly from known highly unsaturated dicyclopentadiene homopolymers.

Aromatic compounds for use in the binding agents according to the invention include, for example, toluene, xylene, cumene, cymene, trimethyl-benzenes, tetrahydronaphthalene and mixtures thereof. If the aromatic component consists of a mixture of compounds, such a mixture advantageously contains a substantial proportion of m-xylene. The aromatic component is desirably m-xylene alone. However, commercially available xylene products are preferred, the meta-xylene content of which lies above 50% by weight.

Aluminium trichloride has proved especially successful as a Friedel-Crafts catalyst in the preparation of binding agents according to the invention. After completion of the reaction the catalyst may be precipitated by conventional methods either with calcium hydroxide, sodium bicarbonate, soda or other inorganic oxides or salts, or may be washed out with water. Any unreacted aromatic hydrocarbon may be advantageously subsequently removed by distillation, except when a solution is to be subsequently prepared in a solvent compatible therewith, e.g. aromatic hydrocarbons.

According to a further aspect of the present invention there are provided adhesive compositions comprising at least one binding agent according to the invention.

The properties of the binding agents according to the invention may be varied over wide limits according to the type and quantity of the aromatic compound used, to the concentration of the catalyst and to the polymerisation reaction conditions. They are generally soluble in aromatic hydrocarbons such as for example benzene, toluene and xylene. Binding agents having properties in the preferred ranges also show a good compatibility with aliphatic hydrocarbons such as for example cyclohexane, heptane, and petrols having a boiling range of from 60° to 95° C. They are also compatible with other conventional resin adhesives such as, for example, colophony and terpene resins, preferably terpene phenol resins; colophony esters; hydrocarbon resins, e.g. hydrogenated cyclopentadiene resins; ethylene-vinyl acetate copolymers; various waxes; and also natural and synthetic rubbers, and may be used together therewith or may at least partially replace the above resin adhesives. The weight ratio of copolymer according to the invention to resin adhesive in such mixtures may be for example 1:9 to 9:1. Anti-oxidants and stabilisers may also be added, as required.

The wide-ranging compatibility, the excellent resistance to oxidation and heat and the very good tackiness of the binding agents according to the invention mean that it is possible to use them widely in adhesives of various types, e.g. in bonding (pressure sensitive) and thermoplastic (melt) adhesives and also in thermoplastic coatings.

When used in pressure-sensitive adhesives they are conveniently used in combination with natural rubber or synthetic elastomers, e.g. styrene-butadiene rubber, chloroprene rubber and acrylonitrile-butadiene rubber. When used in solvent-containing bonding adhesives, especially those based on natural rubber, the binding agents according to the invention are distinguished by very good cohesion and adhesion.

Owing to their good resistance to heat and colour stability the binding agents according to the invention may also be employed in melt adhesives, especially together with ethylene-vinyl acetate copolymers. The proportion of binding agents according to the invention in such adhesives may be, for example, 40 to 120, preferably 70 to 110% by weight, relative to the elastomer or to ethylene-vinyl acetate copolymers.

The following Examples serve to illustrate the present invention. In these Examples, T represents parts by weight and % represents percent by weight. Unless specified otherwise, viscosities were measured in a 70% toluene solution at 20° C.

EXAMPLES

I. Preparation of the polymers (a) To a mixture of 5 T of aluminium trichloride and 300 T of industrial xylene (60% m-, 11% o-, 5% p-xylene, and 22% ethylbenzene) is dropwise added, with stirring at 30° C., 100 T of dicyclopentadiene (95%). The mixture is subsequently allowed to react for a further 2 hours at this temperature and the catalyst is then decomposed with 50 ml of water. The aqueous phase is removed and the reaction solution is washed three times with 50 ml of water. The unreacted xylene is thereupon distilled off. Solvent residues are removed at 250° C. by distillation under reduced pressure. 195 T of resin remain. Characteristics: melting point range, 65° to 70° C. (capillary method); viscosity, 350 mPa.s; mean molar weight, 620; and iodine number, 2.

(b) The reaction is effected according to (a) above, but at a reaction temperature of 45° C. 195 T of resin are obtained with the following characteristics: melting point range, 50 ° to 50° C.; viscosity, 180 mPa.s; mean molar weight, 420; and iodine number, 4.

(c) The reaction is effected according to (a) above, but 400 T of xylene are used. 210 T of resin are obtained with the following characteristics: melting point range, 58° to 62° C.; viscosity, 220 mPa.s; mean molar weight, 540; and iodine number, 3.

(d) It is worked as in Example 1(a) but instead of 300 T of technical xylene now 250 T of 1,2,4-trimethylbenzene are reacted. 240 T of a resin are obtained with the following characteristics; melting point range 60° to 63° C. (capillary method); viscosity 210 mPa.s, average molecular weight 450; and iodine number 6.

(e) It is worked as in Example 1(a) but instead of 300 T technical xylene now 250 T of 1,2,3-trimethylbenzene are reacted. 224 T of resin are obtained with the following characteristics: melting point range, 61° to 64° C. (capillary method); viscosity 190 mPa.s; average molecular weight 470; and iodine number 8.

Because of the lower compatibility of the product of Example 1(e) these resins are not preferred.

(f) Comparison resin

This consists of a commerical hydrogenated thermally polymerised cyclopentadiene resin having the following characteristics: melting point range, 86° to 90° C.; bromine number, 3; and viscosity, 340 mPa.s.

II. Solvent-containing Bonding Adhesives

An adhesive solution is prepared as follows: mixtures of 100 T of natural rubber and 80 T of resin according to Examples (a) to (e) as well as the Comparison Resin (f) are each dissolved in 600 T of petrol (boiling temperature 60° to 95° C.).

Physical test

Test strips consisting of a foil of polyethylene terephthalate were used as substrates and were coated with the adhesive solution in a wet layer thickness of 200 $\mu$m and a width of 15 mm. The solvent was removed from the adhesive strips thus prepared by allowing them to stand for 20 minutes at room temperature and for 20 minutes at 50° C. The test tapes were then stored under atmospheric conditions (23° C./50% atmospheric moisture) and were tested after 24 hours and after 14 days.

The peeling resistance was determined according to PSTC-1 (Pressure Sensitive Tape Council) Standard by rolling a 1 kg roller 10 times without additional pressure over 1.5×10 cm strips of the above-described coated foil onto a cleaned standard steel plate. After 30 minutes the peeling resistance (Newton/15 mm) was measured at an angle of 180° with an advance of 300 mm/minute in a tensile-test machine.

The so-called rolling-ball tack test was conducted to the PSTC-6 Standard. The apparatus consists of an inclined plane with an angle of inclination of 31°. The gradient is 5 cm long. The inclined plane leads to a horizontal run-off plane of glass to which the adhesive strip to be tested is fastened. The test piece used is a steel ball, 10 mm in diameter, which is allowed to roll down onto the adhesive strip from the inclined plane. The distance covered on the test material is a measure of the tack.

Test results

The following Table contains the test results obtained.

| Adhesive containing polymer | Peeling resistance Newton/15 mm | | Rolling-bail tack mm | | |
|---|---|---|---|---|---|
| | 1 day | 14 days | 1 day | 14 days | 50 days |
| (a) | 6.5 | 8.0 | 3 | 9 | — |
| (b) | 6.0 | 7.0 | 2 | 8 | — |
| (c) | 5.5 | 5 | 2 | 7 | — |
| (d) | 5 | 5 | 2 | 4 | 4 |
| (e) | 5 | 5 | 2 | 4 | 4 |
| (f) (comparison) | 5 | 4 | 3 | 8 | — |

The results obtained show that the adhesives containing the binding agents according to the invention generally have approximately the same, but for the most part better, tack values compared with the comparison resin. On the other hand, the peeling resistance of the adhesives according to the invention is clearly better than that of the comparison sample. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. An adhesive binding agent based on at least one alkylation reaction product polymer of dicyclopentadiene and at least one aromatic hydrocarbon wherein the reaction product polymer consists of from 40 to 80% by weight of cyclopentadiene units and from 20 to 60% by weight of at least one aromatic hydrocarbon having a boiling point in the range from 110° to 220° C., selected from the group consisting of methyl-substituted aromatic hydrocarbons and tetrahydronaphthalene, wherein in the reaction product polymer composed of the dicyclopentadiene with the aromatic hydrocarbon, the methyl substituted aromatic hydrocarbons or the tetra-hydronaphthalene respectively are bound to the carbon atoms of the original double bond of the dicyclopentadiene, said reaction product polymers having a mean molecular weight of from 300 to 5000, an iodine number (measured according to DIN Standard 53241, part 2) of from 0 to 10, and a melting point in the range of from 30° to 150° C.

2. A binding agent as claimed in claim 1 wherein the copolymer has an average molecular weight between 400 and 1000, an iodine number between 0 and 10 and a melting temperature between 40° and 100° C.

3. A binding agent as claimed in claim 1 wherein the aromatic component of the polymer contains a substantial proportion of m-xylene units.

4. A binding agent as claimed in claim 1 wherein the polymer has been prepared in the presence of a Friedel-Crafts catalyst.

5. A binding agent as claimed in claim 1 wherein the polymer has an iodine number between 0 and 5.

6. An adhesive containing a binding agent as claimed in claim 1 in combination with a polymer selected from the group consisting of natural rubber, synthetic rubber, and ethylene-vinylacetate copolymers wherein the proportion of the binding agent is between 40 and 120% by weight, referred to the rubber or to the ethylene-vinylacetate copolymers.

7. An adhesive as claimed in claim 6 wherein the proportion of the binding agent is between 70 and 110% by weight, referred to the rubber or to the ethylene-vinylacetate polymers.

8. An adhesive as claimed in claim 6 containing natural rubber.

9. An adhesive as claimed in claim 6 containing an additional resin adhesive wherein the weight ratio of the binding agent to the additional resin adhesive is in the range from 1:9 to 9:1.

10. An adhesive as claimed in claim 6 wherein the additional resin adhesive is a terpene-phenol resin.

11. An adhesive binding agent based on at least one alkylation reaction product polymer of dicyclopentadiene and at least one aromatic hydrocarbon wherein the reaction product polymer is of from 40 to 80% by weight of cyclopentadiene units and from 20 to 60% by weight of at least one aromatic hydrocarbon having a boiling point in the range of 110° to 220° C., selected from the group consisting of methyl-substituted aromatic hydrocarbons and tetrahydronaphthalene wherein in the reaction product the polymer composed of the dicyclopentadiene with the aromatic hydrocarbon, the methyl-substituted aromatic hydrocarbons or the tetrahydronaphthaline respectively are bound to the carbon atoms of the original double bond of the cyclopentadiene, said reaction product polymers having a mean molecular weight between 400 and 1,000, an iodine number between 0 and 5, and a melting temperature between 40° and 100° C.

* * * * *